Patented Nov. 8, 1949

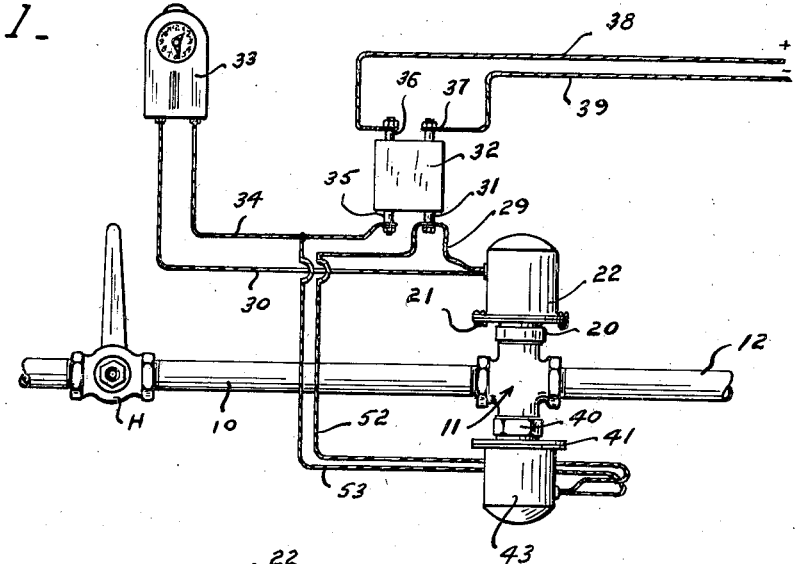

2,487,323

UNITED STATES PATENT OFFICE 2,487,323

FUEL SUPPLY SYSTEM FOR GAS FIRED HEATING PLANTS AND VALVE THEREFOR

Verna F. Fewell, Pampa, Tex.

Application November 6, 1947, Serial No. 784,491

6 Claims. (Cl. 236—75)

This invention relates to a fuel supply system for a gas fired heating plant, such as a domestic heating furnace, and a valve therefor and has for its primary object to supply fuel to the burner of the heating plant even though the electrical control system of the heating plant may be out of service.

In the conventional operation of gas fired heating systems it is customary to employ an electro-magnetically controlled valve to govern the supply of fuel from a gas main to the furnace burner, the opening and closing of which is governed by a conventional thermostat which closes a circuit through the electro-magnet of the valve to open the passage therethrough when the temperature in the space to be heated falls below a predetermined value. In conventional installations, the power for energizing the electro-magnet is supplied through the medium of a conventional transformer which is coupled to a main source of power supply. As a consequence, should the main power supply fail, the electro-magnet of the valve will close even though the temperature in the space to be heated may fall below the temperature at which the thermostat would normally cause the valve to open. It is obvious therefore that when a power failure becomes protracted, the temperature in the space to be heated may fall to unbearable limits and with no means to by-pass the electrically controlled valve serious discomfort and danger to the health of the occupants of the space to be heated may be experienced.

It is therefore another object of this invention automatically to open the fuel supply valve of a thermostatically controlled heating plant should a power failure occur.

Among its features my invention embodies electro-magnetically controlled means adapted to move the main control valve of a conventional thermostatically controlled heating plant into open position when the flow of electrical energy to the thermostat thereof is interrupted.

Other features embody a solenoid the armature of which is yieldingly urged outwardly thereof and is normally held retracted through the energization of the coil thereof by the source of power actuating the valve and means carried by the armature of the solenoid to move the valve to open position when the flow of power through the coil of the solenoid is interrupted.

Still other features embodying a valve body having a flow passage therethrough, a partition separating the flow passage into an inlet and an outlet chamber, said partition having a port therethrough through which communication between the chambers is established when the port is open, a valve normally closing said port, a thermostatically controlled electro-magnet carried by the valve body and adapted to be energized when the temperature in the space to be heated falls below a predetermined valve, an armature actuated by energization of the magnet to move the valve away from the port, a second electro-magnet carried by the valve body, an armature operable within the second electro-magnet, means yieldingly to project the last named armature out of one end of the last named electro-magnet, means carried by the last named armature for engaging the valve and moving it out of port closing position and means coupling the second electro-magnet with a source of electrical energy to hold the armature thereof retracted so long as the second electro-magnet remains energized.

In th drawings—

Figure 1 is a diagrammatic view showing this control valve coupled in a thermostatically controlled system, and Figure 2 is an enlarged sectional view through the valve.

Referring to the drawings in detail a fuel supply pipe 10 has coupled thereto this improved control valve designated generally 11, and coupled to the opposite side of the valve is a burner supply pipe 12. The pipe 10 is coupled to a conventional gas main (not shown) and the burner supply pipe 12 is coupled to a conventional gas burner situated in the furnace of a conventional heating plant or system.

The valve 11 comprises a valve body 13 formed with a flow passage therethrough which is separated into an inlet chamber 14 and a discharge chamber 15 by means of a partition wall 16 having a port 17 extending therethrough by means of which communication between the chambers 14 and 15 is established. As shown in Figure 2 the axis of the port 17 lies perpendicular to the major axis of the valve body 13 and formed in opposite sides of the body 13 in axial alignment with the port 17 are internally screw threaded openings 18 and 19.

Threaded into the opening 18 is a nipple 20 carrying at its end remote from the valve body 13 a base flange 21 upon which is supported within a housing 22 a solenoid coil 23. The nipple 20 is formed with an axial bore 24 in which a valve stem 25 is mounted to slide. This valve stem projects into the chamber 14 of the valve body 13 and carries at its lower end a valve head 26 which is adapted normally to close the port 17. A compression coil spring 27 surrounds the valve stem 25 between the lower end of the nipple 20 and the head 26 yieldingly to urge the valve head 26 into port closing position. The end of the valve stem 25 opposite the head 26 projects well into the tubular core 28 of the coil 23 so that when the coil is energized, the valve head 26 will be moved against the effort of the spring 27 to uncover the port 17 and permit the gaseous fuel to flow from the fuel supply pipe 10 through the valve and into the burner supply pipe 12.

Opposite terminals of the coil 23 are connected through conductors 29 and 30 respectively to one low voltage terminal 31 of a transformer 32 and to one terminal of a thermostat 33, the opposite terminal of which is connected through a conductor 34 to the opposite low voltage terminal 35 of the transformer 32. The high voltage terminals 36 and 37 of the transformer 32 are coupled through the medium of conductors 38 and 39 to conventional power lines through which electrical energy is supplied from a suitable source to the transformer 32.

With the exception of the internally screw threaded opening 19 in the valve body 13, the description so far has been confined to a conventional system for supplying gaseous fuel to the burner of a furnace under thermostatic control and it will be understood that so long as no power failure is experienced, when the temperature of the space to be heated and in which the thermostat 33 is situated falls below a predetermined value, the thermostat functions to close the electrical circuit from the transformer 32 through the coil 23, thus energizing the latter and causing the valve stem 25 to be retracted against the urge of the spring 27 so as to cause the valve head 26 to uncover the port 17. When the temperature rises in the space being heated, the thermostat 33 operates to break the electrical circuit, thus de-energizing the coil 23 and allowing the spring 27 to move the valve head 26 into port closing position. It will thus be seen that when the coil 23 is de-energized no fuel can flow from the fuel supply pipe 10 to the burner supply pipe 12. As a consequence, should a power failure occur the valve head 26 will keep the port 17 closed even though the temperature in the space in which the thermostat is situated may fall far below that for which the thermostat is set.

In order to overcome the condition just described, I thread into the internally screw threaded opening 19 a bushing 40 having an axial bore 41 and carrying at the end remote from that which enters the valve body a base plate 42 to which a suitable hood 43 is attached. Supported on the base plate 42 within the hood 43 is a solenoid coil 44 having a tubular core 45 which aligns axially with the bore 41 in the bushing 40. The end of the bushing 40 remote from the base plate 42 is provided with an inwardly extending annular stop flange 46, the purpose of which will hereinafter appear.

Mounted for axial movement within the core 45 on a compression coil spring 47 is an armature 48. One end of the spring 47 bears on the inner end of the armature 48 while the opposite end of the spring is supported in an axial recess 49 formed in the inner face of the end wall of the hood 43. It will thus be seen that the armature 48 yieldingly will be projected toward the valve head 26 under the influence of the spring 47. In order that the valve head 26 may be lifted to open the port 17 when the armature is projected under the influence of the spring 47, a cushion, which in the present embodiment takes the form of a compression coil spring 50, is seated on the upper end of the armature 48 about a guide pin 51.

One terminal of the coil 44 is coupled to the terminal 31 of the transformer 32 through the medium of a conductor 52, while the opposite terminal of the coil 44 is coupled through the medium of a conductor 53 to the conductor 34 leading to the terminal 35 of the transformer 32. It will thus be seen that so long as the flow of power through conductors 38 and 39 to the transformer 32 remains uninterrupted, the coil 44 will be energized so as to retract the armature 48 and move the spring 50, forming the cushion, out of contact with the valve head 26.

In the operation of the device, the valve 11 functions to establish and interrupt the flow of gas from the gas supply pipe 10 to the burner in the furnace of the heating plant under the control of the thermostat 33 so long as the flow of electrical energy to the transformer is uninterrupted, and with the coil 44 energized, the armature 48 will be held retracted so that the spring 50 is held clear of the valve head 26. Should a power failure occur however, so that the thermostat can no longer function to govern the opening and closing of the valve, it is evident that the coil 44 will become de-energized, thus allowing the armature 48 to advance under the influence of the spring 47 so as to move the spring 50 into contact with the valve head 26 and cause the latter to clear the port 17, thus to supply gas to the burner of the heating plant. In this way the temperature in the space to be heated may be maintained within a desired range by opening and closing the hand controlled cut-off valve H with which all conventional systems of this type are equipped.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. In combination with a gaseous fuel burning system having an electro-magnetic main control valve, a thermostat for governing the opening and closing of said valve and means connected to a power supply line for supplying electrical energy to the magnet of the control valve through said thermostat when the temperature in a space in which the thermostat is located falls below a predetermined value, a solenoid mounted on the control valve and having its coil energized by the electric energy supply, an armature normally retracted into the coil under the influence of magnetic force, means to advance the armature out of the coil when the flow of electric energy thereto is interrupted and means carried by the armature to open the control valve upon the advance of the armature.

2. In combination with a gaseous fuel burning system having an electro-magnetic main control valve, a thermostat for governing the opening and closing of said valve and means connected to a power supply line for supplying electrical energy to the magnet of the control valve through said thermostat when the temperature in a space in which the thermostat is located falls below a predetermined value, a solenoid mounted on the control valve and having its coil energized by the electric energy supply, an armature normally retracted into the coil under the influence of magnetic force, a spring mounted adjacent the coil of the solenoid and engaging the armature thereof for advancing the armature out of the coil when the flow of electrical energy is interrupted and means carried by the armature to open the control valve upon the advance of the armature under the influence of the spring.

3. In combination with a gaseous fuel burning system having an electric-magnetic main control valve, a thermostat for governing the opening and closing of said valve and means connected to a power supply line for supplying electrical energy to the magnet of the control valve through said thermostat when the temperature in a space in which the thermostat is located falls below a predetermined value, a solenoid mounted on the control valve and having its coil energized by the electric energy supply, an armature normally retracted into the coil under the influence of magnetic force, means to advance the armature out of the coil when the flow of electric energy thereto is interrupted, and a cushion carried by the armature to engage the control valve and move it to open position upon the advance of the armature.

4. In combination with a gaseous fuel burning system having an electro-magnetic main control valve, a thermostat for governing the opening and closing of said valve and means connected to a power supply line for supplying electrical energy to the magnet of the control valve through said thermostat when the temperature in a space in which the thermostat is located falls below a predetermined value, a solenoid mounted on the control valve and having its coil energized by the electric energy supply, an armature normally retracted into the coil under the influence of magnetic force, a spring mounted adjacent the coil of the solenoid and engaging the armature thereof for advancing the armature out of the coil when the flow of electrical energy is interrupted, and a cushion carried by the armature to engage the control valve and move it to open position upon the advance of the armature.

5. In combination with a gaseous fuel burning system having an electro-magnetic main control valve, a thermostat for governing the opening and closing of said valve and means connected to a power supply line for supplying electrical energy to the magnet of the control valve through said thermostat when the temperature in a space in which the thermostat is located falls below a predetermined value, a solenoid mounted on the control valve and having its coil energized by the electric energy supply, an armature normally retracted into the coil under the influence of magnetic force, means to advance the armature out of the coil when the flow of electric energy thereto is interrupted, means carried by the armature to open the control valve upon the advance of the armature, and a manually actuated main cut-off valve in the system by which the supply of gaseous fuel to the system may be regulated while the flow of electrical energy to actuate the electro-magnetic valve is interupted.

6. In combination with a gaseous fuel burning system having an electro-magnetic main control valve, a thermostat for governing the opening and closing of said valve and means connected to a power supply line for supplying electrical energy to the magnet of the control valve through said thermostat when the temperature in a space in which the thermostat is located falls below a predetermined value, a solenoid mounted on the control valve and having its coil energized by the electric energy supply, an armature normally retracted into the coil under the influence of magnetic force, a spring mounted adjacent the coil of the solenoid and engaging the armature thereof for advancing the armature out of the coil when the flow of electrical energy is interrupted, a cushion carried by the armature to engage the control valve and move it to open position upon the advance of the armature, and a manually actuated main cut-off valve in the system by which the supply of gaseous fuel to the system may be regulated while the flow of electrical energy to actuate the electro-magnetic valve is interrupted.

VERNA F. FEWELL.

REFERENCES CITED

The following references are of record in the file of this patent:

UNITED STATES PATENTS

| Number | Name | Date |
| --- | --- | --- |
| 1,167,815 | Gold | Jan. 11, 1916 |
| 1,242,003 | Lewis | Oct. 2, 1917 |
| 1,475,129 | Mayer | Nov. 20, 1923 |
| 2,238,401 | Shaw | Apr. 15, 1941 |
| 2,290,047 | Hildebrecht | July 14, 1942 |
| 2,363,073 | Mantz | Nov. 21, 1944 |